United States Patent [19]

Lee et al.

[11] Patent Number: 4,763,242

[45] Date of Patent: Aug. 9, 1988

[54] COMPUTER PROVIDING FLEXIBLE PROCESSOR EXTENSION, FLEXIBLE INSTRUCTION SET EXTENSION, AND IMPLICIT EMULATION FOR UPWARD SOFTWARE COMPATIBILITY

[75] Inventors: Ruby B. Lee, Cupertino; Michael J. Mahon, San Jose, both of Calif.

[73] Assignee: Hewlett-Packard Company, Palo Alto, Calif.

[21] Appl. No.: 790,570

[22] Filed: Oct. 23, 1985

[51] Int. Cl.⁴ .............................. G06F 9/00
[52] U.S. Cl. ................................ 364/200
[58] Field of Search ... 364/200 MS File, 900 MS File

[56] References Cited

U.S. PATENT DOCUMENTS

| | | | |
|---|---|---|---|
| 3,242,465 | 3/1966 | Gloates et al. | 340/172.5 |
| 4,084,235 | 4/1978 | Hirtle et al. | 364/200 |
| 4,104,720 | 8/1978 | Gruner | 364/200 |
| 4,205,370 | 5/1980 | Hirtle | 364/200 |
| 4,484,273 | 11/1984 | Stiffler et al. | 364/200 |
| 4,514,803 | 4/1985 | Agnew et al. | 364/200 |

FOREIGN PATENT DOCUMENTS

| | | |
|---|---|---|
| 0041406 | 12/1981 | European Pat. Off. |
| 0092610 | 11/1983 | European Pat. Off. |
| 0123337 | 10/1984 | European Pat. Off. |

OTHER PUBLICATIONS

Wescon Conference Record, Anaheim, Calif., U.S.A., vol. 24, Sep. 16-18, 1980, Bursky: "Enhancing CPU Performance: Slave, Co-Processor, Smart I/O Alternatives", pp. 1-8.

Primary Examiner—Gareth D. Shaw
Assistant Examiner—Debra A. Chun
Attorney, Agent, or Firm—Douglas L. Weller

[57] ABSTRACT

A computer and an instruction set are presented which allow for a number of assists to be easily incorporated into the computer, and which allow for an instruction set extension. The computer is designed to support instructions which move data between an assist and a location, although an assist's operation and design need not be defined at the computer's date of design. Instructions are mapped to a particular assist. Assist instructions can be either executed in hardware by an assist, or emulated in software via a trap.

13 Claims, 6 Drawing Sheets

FIG 3 (CLDWX)

FIG 4 (COPR)

COMPUTER PROVIDING FLEXIBLE PROCESSOR EXTENSION, FLEXIBLE INSTRUCTION SET EXTENSION, AND IMPLICIT EMULATION FOR UPWARD SOFTWARE COMPATIBILITY

BACKGROUND

The present invention relates to a computer into which a number of assists can be easily added without compromising software compatibility. An assist is hardware which extends a processor's capability. The proposed computer can support assists that are undefined at the computer's date of design. In addition to being able to execute a basic instruction set, the computer can execute one or more extension instruction sets. An extension instruction set contains instructions that do not belong to the basic instruction set. The computer can implement the extension instruction, either executed in hardware via an assist, or emulated in software via a trap.

In the prior art, it was either impossible or impractical to incorporate an assist into a computer, if the assist was undefined at the computer's date of design. Incorporating the assist into the computer would adversely impact datapaths and controls of a processor within the ccmputer, and would fail to satisfy speed requirements for both a main processor and the assist. Another version of the computer would have to be designed which could more practically incorporate the assist.

In the prior art, a computer sometimes incorporated a floating-point accelerator as a very specialized add-on assist. A typical floating-point accelerator had a highly specialized interface to a processor. This highly specialized interface did not allow an incorporation of a different type of assist.

In the prior art, a limited method was devised whereby only a very few assists could be added to a computer. Software programs written for a first computer, the first computer including a first main processor and a first assist, were not portable to a second computer, the second computer including the first main processor but not the first assist.

In the prior art, a first computer was designed to execute a basic instruction set. The first computer suffered the disadvantage of being unable to execute extension instructions defined at a later date. A second computer had to be designed which could execute the extension instructions as well as the basic instruction set. There was no upward compatibility; although the second computer could execute programs written for the first computer, the first computer could not execute programs written for the second computer.

In the prior art, a scheme was devised whereby numerous opcodes were reserved within a basic instruction set for extension instructions. The scheme was less than optimal, since too much valuable opcode space in the basic instruction set was reserved for currently undefined extension instructions.

In a variation of the scheme just discussed, a second scheme was devised in which minimal opcode space in the basic instruction set was reserved for an escape instruction. The escape instruction indicated that subsequent instructions were not to be decoded as part of the basic set, but as extension instructions, until another escape instruction was encountered. While the second scheme solved a disadvantage in which too many opcodes were reserved for extension instructions, the first computer was still unable to execute an extension instruction, and a second computer had to be designed.

In the prior art, a computer was designed to run with an add-on assist either present or absent. If the add-on assist was present in a configuration, a program with an extension instruction intended for the add-on assist would be executed in hardware by the add-on assist. If the add-on assist was absent in the configuration, code had to be written with a branch instruction instead of the extension instruction. The branch instruction caused execution to jump to a software routine that would emulate execution of the extension instruction.

A serious disadvantage of the branch instruction was that it did not provide software compatiblity. Code written for a first computer that incorporated the add-on assist was not portable to a second computer that did not incorporate the add-on assist, unless the code was completely recompiled. Code written for the second computer had to be completely recompiled if the code was to operate efficiently as possible on the first computer.

Another disadvantage of the branch instruction was that it did not provide fault tolerance at run-time. No option for emulation existed at run-time if the add-on assist failed. If the add-on assist failed at run-time, code written for the first computer could not be executed.

SUMMARY OF THE INVENTION

In accordance with the preferred embodiment of the present invention, a computer, including a main processor, a memory system, and an assist, are presented which provide for flexible incorporation of additional assists, which provide for a flexible extension of a basic instruction set, which provide for implicit emulation of an extension of the basic instruction set, and which provide for software compatibility between computers with different configurations of assists, including configurations with no assists.

An assist can be incorporated into the computer, provided the assist follows a pre-defined hardware protocol, simply by attaching the assist to the main processor via a set of buses. The assist decodes its own instructions, so that actual functional operations performed by the assist can be defined at a later date. The hardware protocol is set up so that the main processor is indifferent to the actual number of assist's incorporated into the computer, and to any actual functional operations performed by a particular assist. The hardware protocol operates in conjunction with software emulation so as to make the main processor indifferent to a presence or absence of a particular assist within the computer.

The main processor interfaces with an assist in one of two ways, based upon a datapath used by the assist. An assist is defined as either a Special Function Unit, abbreviated SFU, or as a co-processor, abbreviated COP.

An SFU receives and sends data to the main processor's registers. An SFU can be incorporated into the computer by directly impacting internal register buses of the main processor. Direct coupling to the main processor's internal register buses enables an SFU to achieve a very high performance level. For an integrated main processor, such as a Very Large Scale Integrated processor on a chip, an SFU can also be incorporated by attaching to an external bus, achieving a reduced performance level, but thereby not directly impacting the internal register buses of the main processor.

A COP receives and sends data to the memory system. A memory system is typically either a main memory or a cache in conjunction with a main memory. A COP is incorporated into the computer without impacting internal register buses of the processor. A COP is incorporated into the computer without impacting the processor's software register allocation and optimization problem. The main processor performs address calculations, virtual memory addressing, and virtual memory protection checking for a COP.

Assist instructions define all data movement allowed between an assist and another location. The main processor decodes and supports a processor field of an assist instruction. Hardware control and datapath needs for the first field are built into the computer. The assist decodes and supports an assist field of the assist instruction.

The assist instructions are generic in nature; they define movement of data without regard to functional operations performed by the assists upon that data. This allows the computer to be easily configured with additional assists whose operations need not be defined at the computer's date of design. Opcode space is reserved within assist instructions so that functional operations can be defined at a later date.

Four basic opcodes are reserved within the basic instruction set for all possible instruction set extensions. One basic opcode is reserved for SFU extension instructions, one for COP extension instructions, and two for COP load and store instructions. Any extension instruction, with one of these four basic opcodes is called an assist instruction.

An extension of the basic instruction set can be accomplished by defining opcode space reserved within the assist instructions for functional operations to be performed by an assist. The assist can be designed to perform a functional operation which accomplishes an extension of the basic instruction set. A particular set of extension instructions can be identified by a map field within an assist field of the assist instruction. The map field is recognized by the assist for whom the assist instruction is intended.

Since data movement for assist instructions is supported by the computer, the assist can be easily incorporated into the computer. The computer can be configured with a particular set of assists so that assist instructions are defined and tailored for a particular application.

The present invention implements implicit emulation. If the computer encounters an assist instruction at run time for an assist that is unable to execute, being either absent or failed, the main processor takes an emulation trap. Software emulates a functional operation defined by the assist instruction. If the assist is able to execute, the emulation trap is not taken, and the assist executes the assist instruction.

The emulation trap is a delayed, implicit trap. The hardware protocol calls for an assist to acknowledge its presence and its alive state in order to prevent the emulation trap from being taken. The emulation trap is taken by default if the assist does not acknowledge its presence.

The assist instructions and the hardware protocol allow the computer to be configured with a set of assists enabling an instruction set extension to be executed in hardware. When the computer is configured without a particular assist, the computer takes an emulation trap for assist instructions which map to the particular assist, so that those assist instructions can be emulated in software.

Upward software compatibility is provided, since via the emulation trap a configuration without a particular assist can still run code containing a particular assist instruction mapped to the particular assist. The implicit emulation trap and the hardware assists protocol also provide fault tolerance, since an assist that fails at execution time implicitly invokes the emulation trap to execute the assist instructions in software, thereby continuing execution, but with degraded performance. Hence, the current invention provides not only upward software compatibility but also fault tolerant features.

DESCRIPTION OF THE PREFERRED EMBODIMENT

Figure 1:
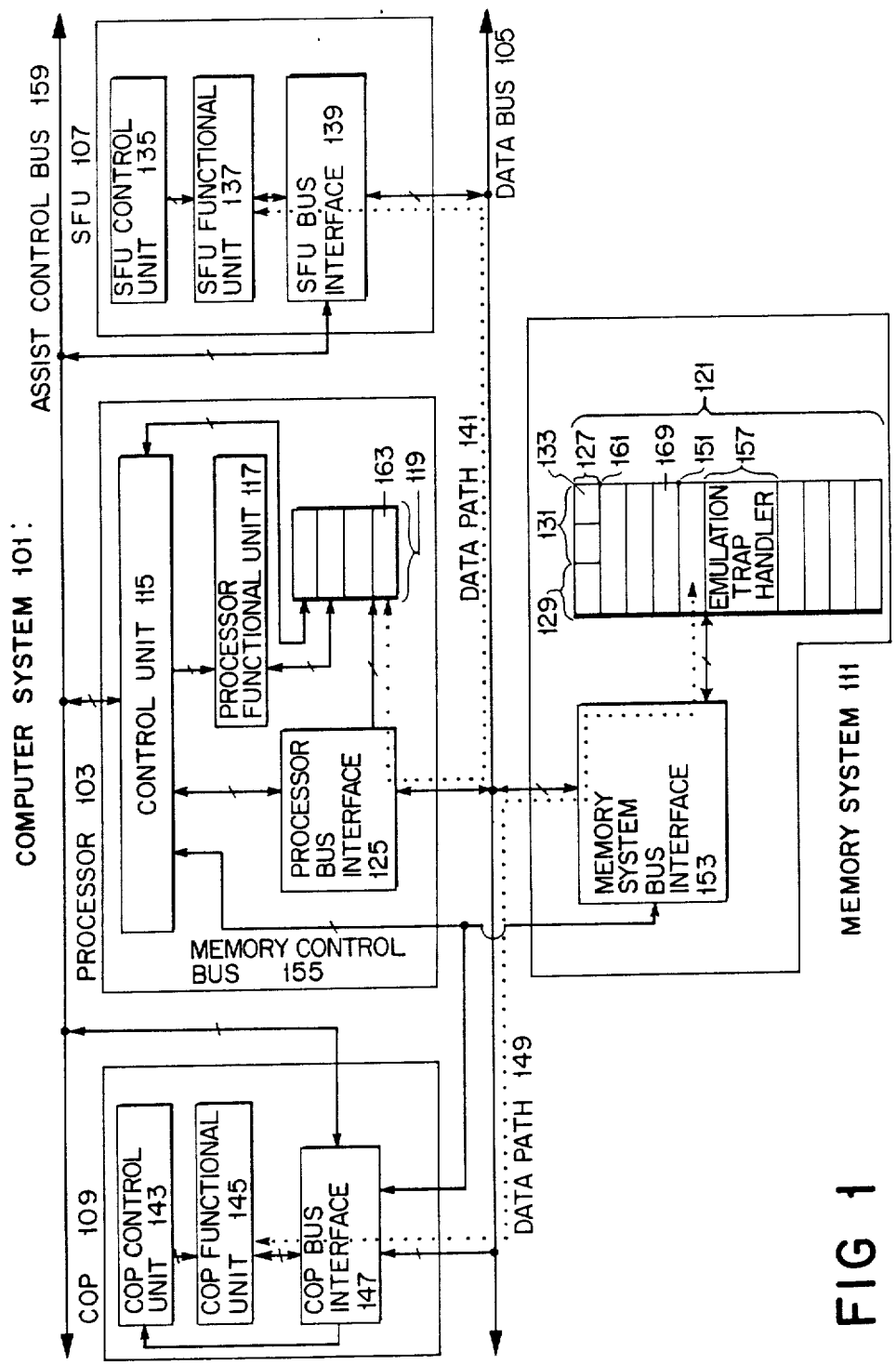
FIG. 1 is a block diagram of a preferred embodiment of the computer, an SFU, and a COP.

FIG. 1 is a block diagram of a computer configured with an SFU and a COP. A main processor 103 is connected via a data bus 105 to an SFU 107, a COP 109, and a memory system 111.

Main processor 103 includes a control unit 115, a processor functional unit 117, a plurality of registers 119, and a processor bus interface 125. Control unit 115 receives an instruction 127 from memory system 111 via data bus 105 and processor bus interface 125.

Memory system 111 includes a plurality of memory addresses 121. A plurality of words is stored within memory system 111, each word being located at a corresponding memory address. Instruction 127 is just one instruction among a plurality of instructions located within plurality of memory addresses 121. A word 169, just one word among the plurality of words, is also located within plurality of memory addresses 121.

Instruction 127 comprises a processor field 129 and an assist field 131. Control unit 115 decodes processor field 129. If processor field 129 indicates that instruction 127 is a basic instruction, processor functional unit 117 executes instruction 127, loading or storing any required operands or results in plurality of registers 119 or in memory system 111.

If processor field 129 indicates that instruction 127 is an assist instruction, stores a copy of instruction 127 is stored in a register among plurality of registers 119. An instruction space and an instruction offset which indicate a memory address 161 at which instruction 127 is located are also stored in registers 119. If a data reference is specified in instruction 127, a data space and a data offset which indicate a data address are also stored in registers 119.

Instruction 127 is also transferred to either SFU 107 or COP 109, and control unit 115 directs data movement defined by processor field 129. Assist field 131 includes a map field 133, which maps instruction 127 to SFU 107, to COP 109, or to another assist.

SFU 107 includes an SFU control unit 135, an SFU functional unit 137, and an SFU bus interface 139. SFU bus interface 139 passes instruction 127 on to SFU control unit 135. SFU functional unit 137 executes assist field 131. Control unit 115 directs SFU bus interface 139 via an assist control bus 159. Control unit 115 directs data movement via a data path 141 between a register 163, among plurality of registers 119, and SFU functional unit 137.

COP 109 includes a COP control unit 143, a COP functional unit 145, and a COP bus interface 147. COP bus interface 147 passes instruction 127 on to COP control unit 143. COP functional unit 145 executes assist field 131. Control unit 115 directs COP bus interface 147 via assist control bus 159. Control unit 115 directs data movement via a data path 149 between a memory address 151 and COP functional unit 145.

Data path 141 can move data between a particular register among plurality of registers 119 and a particular SFU functional unit among a plurality of SFU's. Data path 149 can move data between a particular memory address among plurality of memory addresses 121 and a particular COP functional unit among a plurality of COP's.

Memory address 151, which stores word 169, is located among plurality of memory addresses 121. Memory addresses are accessed through a memory system bus interface 153, which is directed by control unit 115 via a memory control bus 155. An emulation trap handler 157 resides in memory system 111.

Figure 2:
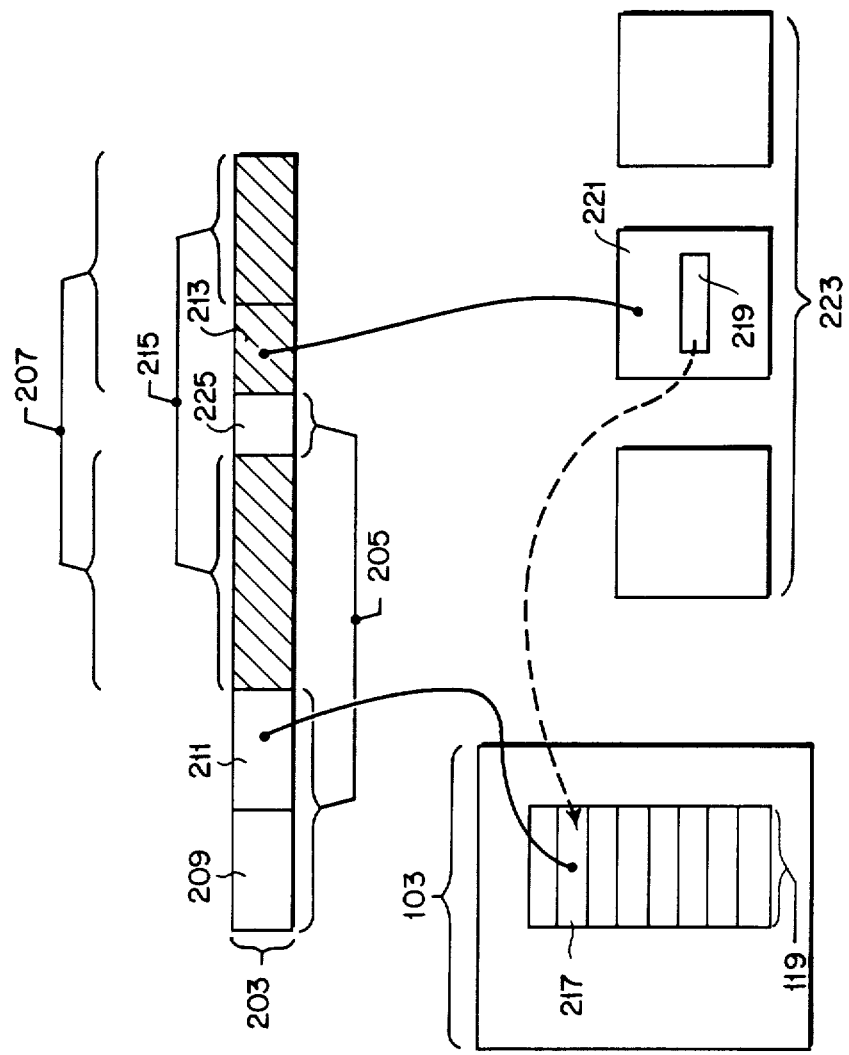
FIG. 2 is an operational diagram of a typical SFU instruction.

FIG. 2 is a detailed diagram of a typical SFU instruction 203. SFU instruction 203 includes a processor field 205 and an assist field 207. Processor field 205 is decoded and executed by main processor 103, and assist field 207 is decoded and executed by SFU 107. Processor field 205 includes a major op field 209, a register target field 211, and a minor op field 225. Assist field 207 includes a map field 213 and a functional op field 215.

Major op field 209 identifies SFU instruction 127 as an assist instruction. Minor op field 225 identifies a particular type of generic data movement to be performed, in this instance "store from SFU." Register target field 211 specifies a register 217 among plurality of registers 119. Major op field 209 directs main processor 103 to move a data word 219, originating from an assist, off data bus 105 and into register 217. Main processor 103 is indifferent to which particular assist data word 219 originates from. Main processor 103 communicates with all assists via a hardware protocol which supports from 0 to 16 assists at any given time. The hardware protocol is discussed in greater detail below, in conjunction with FIG. 6.

An SFU 221 is among a plurality of SFU's 223. Map field 213 maps SFU instruction 203 to SFU 221. Data op field 215 directs SFU 223 to perform a specified functional operation upon a specified set of operands. Major op field 209 and functional op field 215 direct SFU 221 to move data word 219 onto data bus 105.

Since main processor 103 does not decode assist field 207, and since main processor 103 interfaces with each assist in an identical fashion, a second assist can be designed at a future date and easily coupled to data bus 105 and to assist control bus 159. So long as the second assist follows the hardware protocol in interfacing with main processor 103, functional op field 215 will be able to direct the second assist to perform a currently undefined operation.

Other SFU instructions are defined with the same major opcode 290, but different minor op field 225, allowing other forms of generic data movement between the processor and any SFU. For example, zero, one, or two words may be moved from a processor register among a plurality of registers 119 into an SFU.

Figure 3:
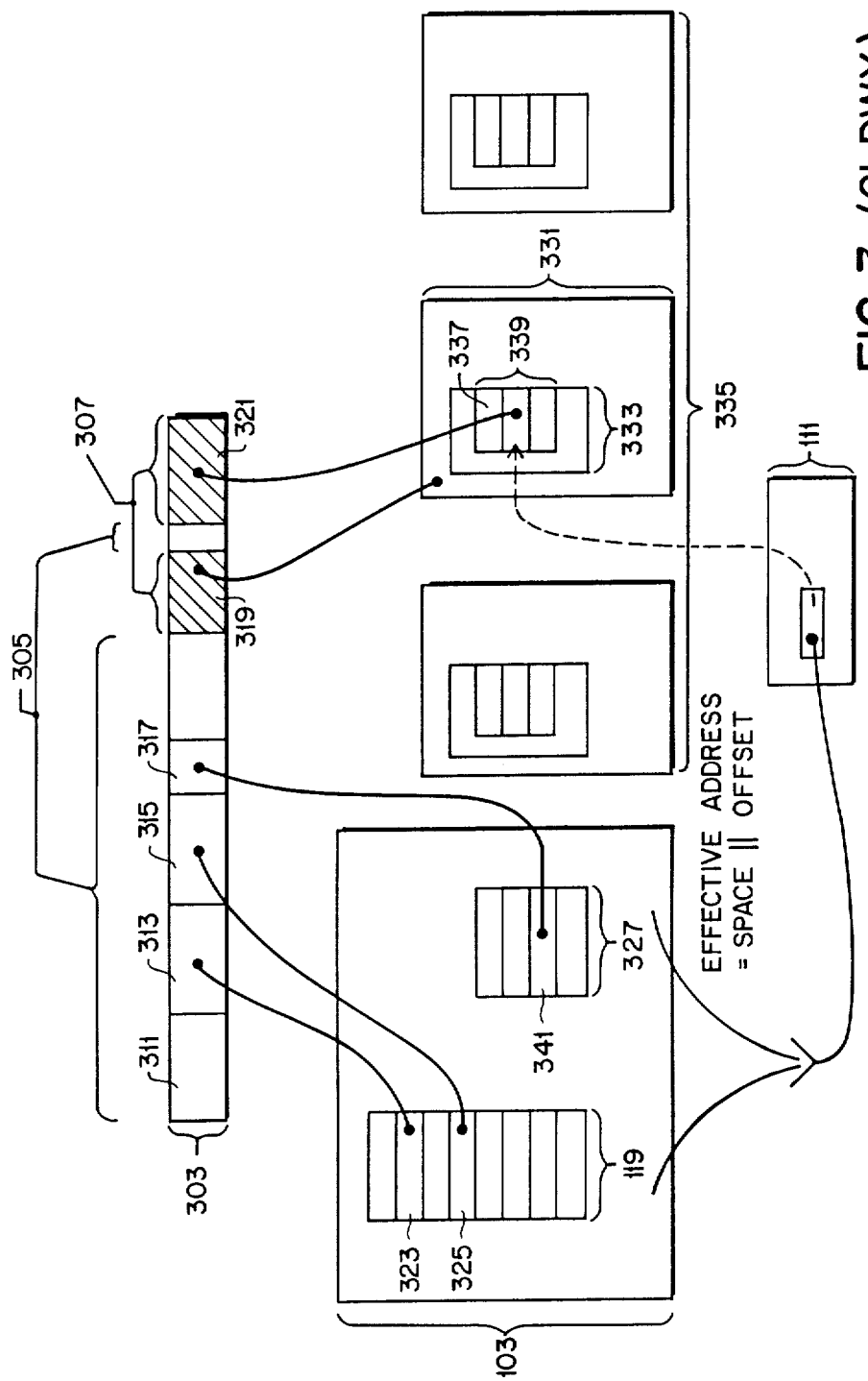
FIG. 3 is an operational diagram of a first typical COP instruction.

FIG. 3 is a detailed diagram of a typical COP load or store instruction 303. COP instruction 303 includes a processor field 305 and an assist field 307. Processor field 305 is decoded and executed by main processor 103, and assist field 307 is decoded and executed by COP 109. Processor field 305 includes a major op field 311, a register source field 313, a register index field 315, and a space register specifier 317. Assist field 307 includes a map field 319 and a register target field 321.

Register source field 313 specifies a source register 323 among plurality of registers 119 within main processor 103. Register index field 315 specifies an index register 325 among plurality of registers 119. Space register specifier 317 specifies a space register 341 among a plurality of space registers 327.

Main processor 103 calculates an effective address, based upon data within source register 323, index register 325, space register 341, and other data within processor field 305. Main processor 103 calculates the effective address to insure that virtual addressing integrity and protection checking integrity are maintained. The effective address is a concatenation of a virtual address space and an address offset. The virtual address space is calculated from data within space register 341, and the other data within processor field 305. The address offset is calculated from data within source register 323, index register 325, and the other data within processor field 305.

A word 329 is located in memory system at the effective address. A COP 331 includes a functional unit 333, which includes a plurality of registers 339. Word 329 is loaded into a target register 337 among plurality of registers 339. COP 331 is grouped among a plurality of COP's 335. Map field 319 maps COP instruction 303 to COP 331. Target register 337 is specified by register target field 321. Other COP load and store instructions are defined similarly, except that the amount of data transferred, and the method of calculating the effective address is different. In a COP store instruction, the data is transferred from the COP to memory system 111.

Figure 4:
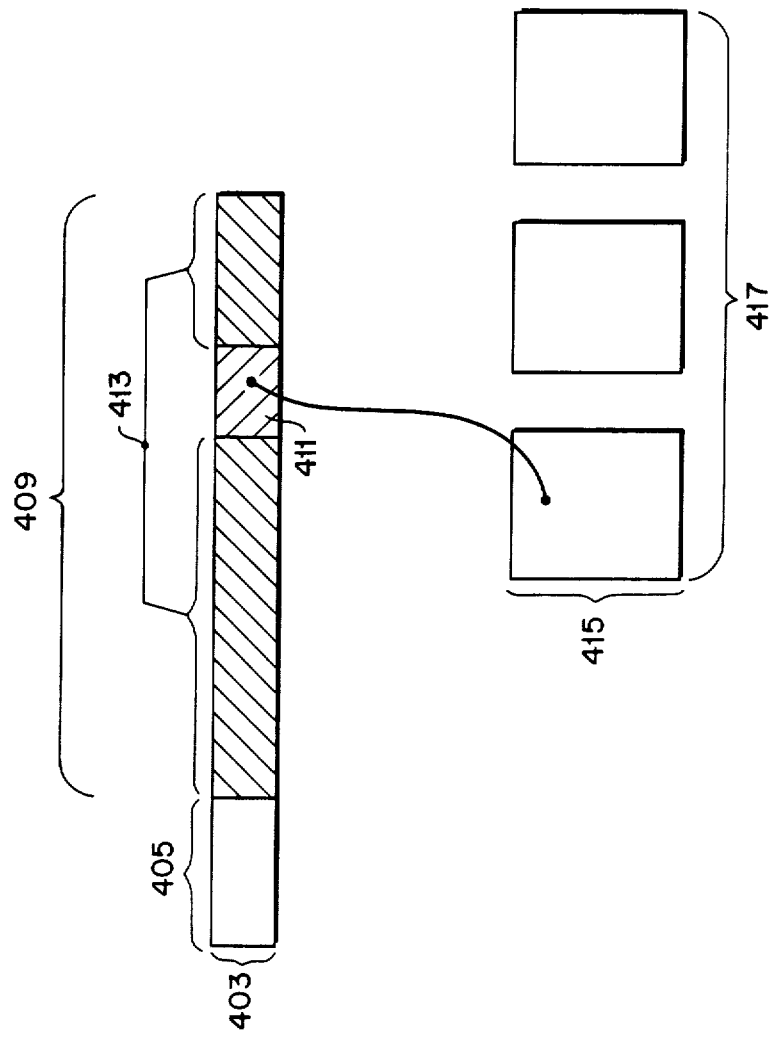
FIG. 4 is an operational diagram of a second typical COP instruction.

FIG. 4 is a detailed diagram of a COP instruction 403. COP instruction 403 includes a processor field 405 and an assist field 409. Processor field 409 comprises a major op code. Assist field 407 includes a map field 411 and a functional op field 413.

A COP 415 is among a plurality of COP's 417. Map field 413 maps COP instruction 403 to COP 415. Data op field 413 directs COP 415 to perform a specified functional operation upon specified operands.

Figure 5:
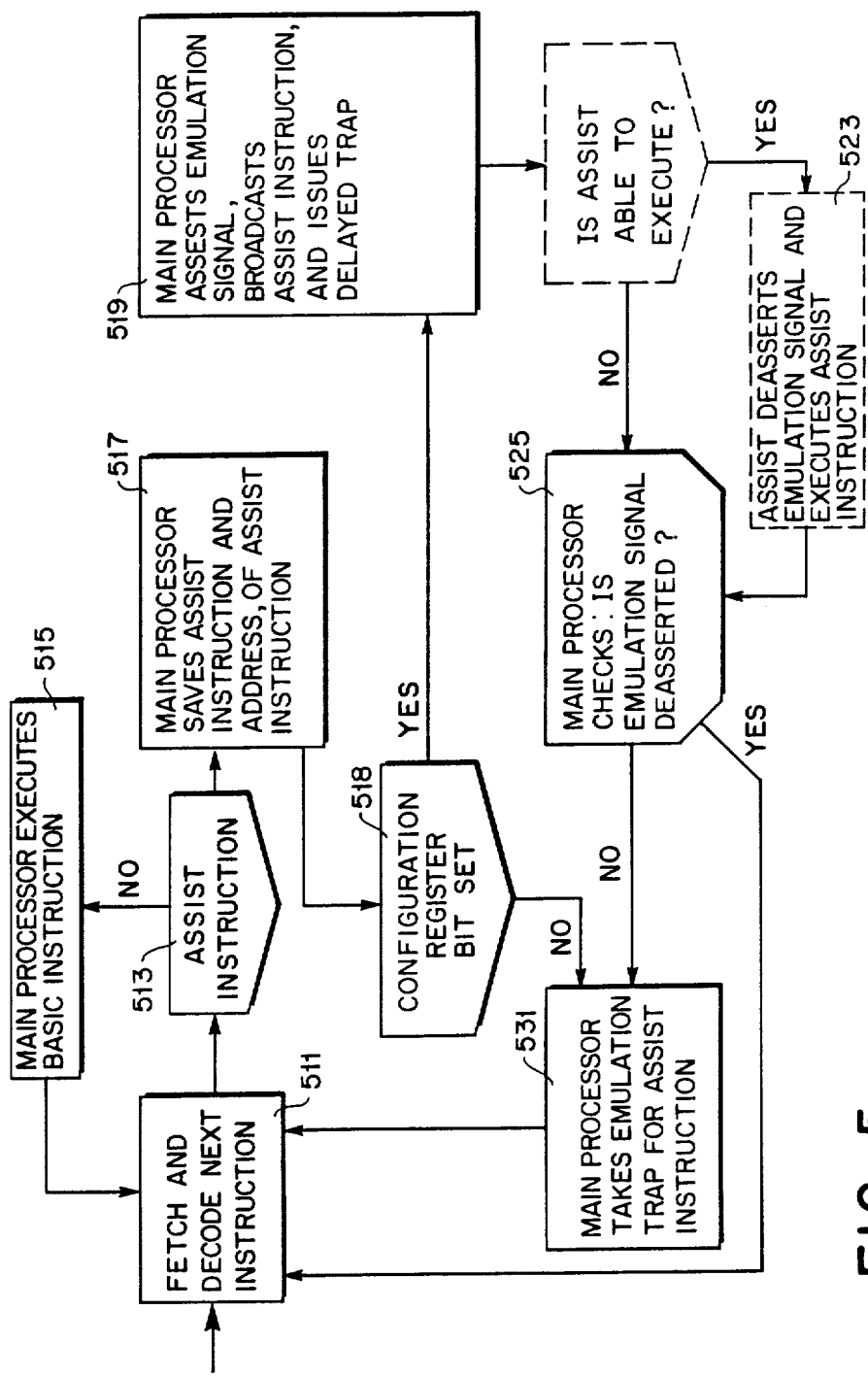
FIG. 5 is a flow chart depicting steps taken for an emulation trap.

FIG. 5 is a flow chart depicting steps taken for an emulation trap. Main processor 103 may execute in a pipelined mode, so that a plurality of pipeline stages for different instructions are performed simultaneously. In a step 511, main processor 103 fetches an instruction from memory system 111, and control unit 115 decodes the instruction. If control unit 115 ascertains in a step 513 that the instruction is a basic instruction, not an assist instruction, processor functional unit 117 executes the basic instruction in a step 515. Main processor 103 returns to step 511; another instruction is fetched and decoded.

If control unit 115 ascertains in step 513 that the instruction is an assist instruction, in a step 517 the assist instruction and information indicating an address of the assist instruction is saved in interrupt parameter registers, among plurality of registers 119. For co-processor load and store instructions, information indicating the effective address of an associated data word is also saved in interrupt parameter registers. In a pipelined processor 103, information is saved in the interrupt parameter registers in such a way that these registers contain information relative to the instruction that caused the interrupt, when the interrupt is finally taken. In step 518, control unit 115 determines if the bit, corresponding to the particular assist, in the co-processor configuration register is set. At system initialization time, a bit in the co-processor configuration register is set for every co-processor included in the hardware configuration for this system. The co-processor configuration register is one register among plurality of registers 119. If the bit in the co-processor configuration register is set, then execution continues at step 519, otherwise the main processor takes an emulation trap at step 531.

In a step 519, control unit 115 asserts an emulation signal within assist control bus 159, or this signal is normally asserted by a pull-up on that line of the assist control bus 159. The assist instruction is broadcast out over data bus 105. Main processor 103 issues an implicit, delayed trap. The implicit, delayed trap is an emulation trap; the emulation trap will be taken if, after an interval of time has passed, the emulation signal is still asserted. If the assist instruction is mapped to an assist that is unable to execute, the emulation signal is not deasserted or pulled down.

If the assist instruction is mapped to an assist that is able to execute, the assist acknowledges main processor 103 by deasserting the emulation signal and executing the assist instruction in a step 523. Deasserting the emulation signal is performed to prevent main processor 103 from taking the delayed trap on the assist instruction.

If main processor 103 ascertains in step 525 that the emulation signal is still asserted, main processor 103 takes a software emulation trap, and emulation trap handler 157 is run to emulate the assist instruction in a step 531.

Emulation trap handler 157 determines from the assist instruction which assist was mapped and which operation was desired, in order to jump to appropriate emulation code for emulating the assist instruction. Emulation trap handler 157 wastes no time in re-fetching the assist instruction or in determining the address of the assist instruction or the address of the associated data word, since pertinent values have already been saved in the interrupt parameter registers among plurality of registers 119. Without the interrupt parameter registers, this information would no longer be present in processor 103, if processor 105 were a pipelined processor.

Figure 6:
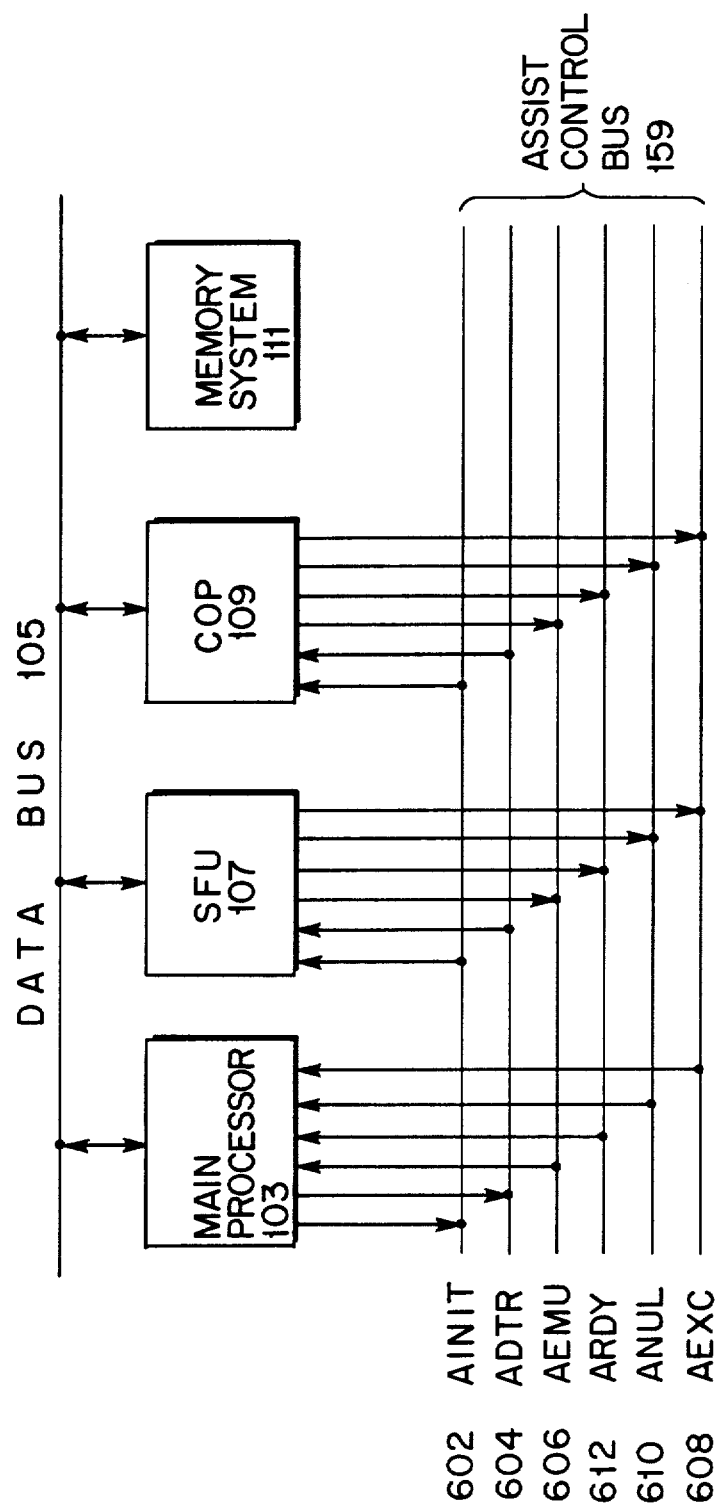
FIG. 6 is a detailed diagram of an assist control bus.

FIG. 6 is a block diagram showing one possible type of assist control bus 159, depicted in FIG. 1, in greater detail. Main processor 103, SFU 107, and COP 109 are connected to memory system 111 via data bus 105. Main processor 103, SFU 107, and COP 109 are also connected to each other via assist control bus 159. Assist control bus 159 comprises a signal "assist initiate" 602, abbreviated AINIT, a signal "assist data transfer" 604, abbreviated ADTR, a signal "assist emulate" 606, abbreviated AEMU, a signal "assist exception" 608, abbreviated AEXC, a signal "assist nullify" 610, abbreviated ANUL, and a signal "assist ready" 612, abbreviated ARDY.

AINIT 602 is a signal from main processor 103 for timing and identifying "assist cycles." ADTR 604 is a signal from main processor 103 for identifying whether an assist cycle is a data transfer cycle or a command cycle. ARDY 612 is a response signal from an assist for indicating that the assist is ready to continue.

AEMU 606 is a response signal from an assist for indicating that the assist is present in the configuration, and therefore does not need to be emulated in software. AEXC 608 is a response signal from an assist for indicating that an operation could not be successfully completed, and that an exception trap should be taken to perform any necessary handling.

ANUL 610 is a response signal from an assist for indicating that a next instruction should be nullified. ANUL 610 is typically used in conjunction with having the assist test a condition, and using ANUL 610 to nullify a branch instruction should the condition be met.

If processor field 129 indicates to control unit 115 that instruction 127 is an assist instruction, main processor 103 places instruction 127 onto data bus 105 for a clock cycle. Instruction 127 is mapped to a particular assist, and the particular assist, if present and alive, is expected to recognize a particular value of map field 133 within instruction 127. The clock cycle is called a command cycle. Main processor 103 asserts AINIT 602 for the first half of the command cycle. During the command cycle, main processor 103 deasserts ADTR 604 to indicate that an assist instruction, rather than a data transfer, is coming across data bus 105.

A clock cycle, called a response cycle, follows the command cycle. On a falling edge of the response cycle, main processor 103 samples AEMU 606, ARDY 612, AEXC 608, and ANUL 610. If map field 133 maps instruction 127 to an assist that is absent or failed, then no assist recognizes map field 133, and AEMU 606 remains asserted. If AEMU 606 is asserted, main processor 103 takes an emulation trap, and the assist instruction is emulated in software. If map field 133 maps instruction 127 to an assist that is present and alive, the assist deasserts AEMU 606.

If the assist asserts ARDY 612, the assist is indicating to main processor 103 that values of AEXC 608 and ANUL 610 are also valid. The assist asserts ARDY 612 to indicate that the assist is ready to continue with a data transfer cycle. If the assist is present, but not ready to continue, the assist deasserts both ARDY 612 and AEMU 606.

If ARDY 612 is deasserted during the response cycle, main processor 103 executes one or more wait cycles. At the middle of each wait cycle, main processor 103 samples ARDY 612. Wait cycles continue and main processor 103 continues sampling until ARDY 612 is asserted by the assist.

Following any wait cycles, main processor 103 asserts ADTR 604 throughout one or more data transfer cycles to indicate that a data transfer, rather than an assist instruction, is coming across data bus 105. Main processor 103 asserts AINIT 602 for a first half of the first data transfer cycle.

When instruction 127 is a "store from SFU and operate" instruction mapped to SFU 107, SFU bus interface 139 drives data specified by assist field 131 onto data bus 105. Processor bus interface 125 latches onto the specified data, and moves the data to register 163, specified by processor field 129.

When instruction 127 is a "load to SFU and operate" instruction mapped to SFU 107, processor bus interface 125 drives data stored in register 163, specified by processor field 129, onto data bus 105. SFU bus interface 139 latches onto the data and moves the data to SFU functional unit 137.

Instruction 127 may direct that two words are to be moved from main processor 103 to SFU 107. The two words may be moved in one data transfer cycle, provided data bus 105 is sufficiently wide, or the two words may be moved in two data transfer cycles, if data bus 105 can only transfer one word per cycle.

When instruction 127 is a "store from COP" instruction mapped to COP 109, word 169 is moved from COP functional unit 145 to memory address 151. Memory transaction timing is similar to memory transaction timing for a basic instruction that stores a word to memory address 151 from main processor 103. Processor functional unit 117 translates a location specified by processor field 129 into memory address 151. Main processor 103 performs virtual memory addressing calculations and virtual memory protection checking. Processor bus interface 125 drives memory address 151 onto data bus 105 during a first data transfer cycle. In a second data transfer cycle, COP bus interface 147 drives a word onto data bus 105, where the word is stored in memory system 111. COP bus interface 147 samples memory control bus 155 in order to know when word 169 may be removed from data bus 105. If memory system 111 is not ready, memory wait cycles are inserted.

When instruction 127 is a "load to COP" instruction mapped to COP 109, execution is similar to execution for a "store from COP" instruction, except that word 169 is moved from memory address 151 to COP functional unit 145.

When instruction 127 is a "load double word to COP" instruction mapped to COP 109, execution is similar to execution for a "load to COP" instruction, except that two words are transferred rather than one. When instruction 127 is a "store double word to COP" instruction mapped to COP 109, execution is similar to execution for a "store to COP" instruction, except that two words are transferred rather than one.

A final data transfer cycle may be followed by a single recovery cycle. The single recovery cycle provides data hold time and prevents bus contention with a following processor cycle. Response cycles for assist instructions which do not move any data, such as COP instructions 403, are also followed by a single recovery cycle.

We claim:

1. A computing device, comprising:
   a bus which carries data;
   an assist, which can be coupled to the bus and which can be uncoupled from the bus, including a first functional means for executing an assist instruction;
   a main processor, coupled to the bus, including a second functional means for executing a set of basic instructions;
   a system memory which contains emulation code allowing the emulation of the assist instruction; and,
   a communication means, coupled to the main processor and coupled to the assist when the assist is coupled to the data bus, for enabling the main processor to determine if the assist is able to execute the assist instruction, wherein the main processor, via the data bus, transfers
   the assist instruction to the assist when the assist is able to execute the assist instruction and wherein the main processor, using the emulation code within the system memory, executes
   the assist instruction when the assist is unable to execute the assist instruction.

2. A computing device as in claim 1, wherein
   the assist instruction and its address are saved in registers in the main processor.

3. A computing device as in claim 2, wherein
   a data offset address and a virtual space identifier for the assist instruction are saved in registers in the main processor.

4. A computing device as in claim 1 wherein the main processor includes a configuration register means for indicating whether the computing device has been configured so that the assist is coupled to the bus.

5. A computing device as in claim 4 wherein the emulation code includes an emulation trap sequence which directs the processor to emulate execution of the assist instruction when the configuration register indicates that the computing device has been configured so that the assist is not coupled to the bus and been configured so that the assist is not coupled to the bus, and when the assist indicates it is unable to execute the assist instruction.

6. A computing device, comprising:
   a bus which carries data;
   a first assist which executes a first field of a first instruction, including:
      a first controlling means for controlling the first field,
      a first functional means, responsive to the first controlling means, for executing the first field, and,
      a first interface means for moving data between the first functional means and the bus;
   a memory system, including:
      a plurality of memory locations which store data, and,
      a second interface means for moving data between a
   first memory location and the bus; and,
   a main processor which executes a second field of the first instruction, including:
      a second controlling means for decoding the second field and for controlling the first and second interface means, thereby controlling data movement via the bus between the first memory location and the first functional means, wherein the main processor performs address calculations when data is to be moved between the first assist and the memory system.

7. A computing device as in claim 6, wherein
   the main processor performs virtual memory addressing when data is to be moved between the first assist and the memory system; and wherein
   the main processor performs memory protection checking when data is to be moved between the first assist and the memory system.

8. A computing device as in claim 6, further comprising:
   a second assist which executes a third field of a second instruction, including:
      a third controlling means for controlling the third field, a second functional means, responsive to the third controlling means, for executing the third field, and, a third interface means for moving data between the second functional means and the bus;

wherein the main processor further includes:
a set of registers which store data, and
a fourth interface means for moving data between the bus and a first register from the plurality of registers; and, wherein the second controling means controls the fourth interface means and the third interface means, thereby controlling data movement via the bus between the first register and the second functional means.

9. A computing device as in claim 8 additionally comprising:
a communication means, coupled to the main process, for allowing the main processor to determine if a third assist is able to execute a third instruction,
wherein the main processor via the bus transfers the third instruction to the third assist when the third assist is able to execute the third instruction and
wherein the main processor emulates execution of the third instruction by executing a series of basic instructions when the third assist is unable to execute the third instruction.

10. A computing device as in claim 9 wherein, by means of a map field within the third instruction, the third assist is able to recognize the third instruction as being addressed to the third assist.

11. A computing device as in claim 10, wherein the main processor, by checking
a major op field within the third instruction, is able to distinguish the third instruction from a plurality of basic instructions.

12. A computing device as in claim 11 additionally comprising a fourth assist, wherein a fourth instruction sent from the main processor to the fourth assist includes:
a data movement field which directs data movement between the fourth assist and a location; and,
a functional op field which directs the fourth assist to perform a functional operation.

13. A protocol device which allows communication between a main processor and a plurlity of assists, wherein the plurality of assists includes a first assist, the protocol device comprising:
a memory system;
a bus, coupled to the memory system, to the main proceossor, and to each assist in the plurality of assists, the bus being used to transfer data and instructions from the main processor to assists in the plurality of assists;
a first control means, coupled to the main processor and to each assist from the plurality of assists, for indicating when the bus is carrying data as opposed to instructions;
a first response means, coupled to the main processor and to each assist in the plurality of assists, for allowing the first assist to indicate its presence to the main processor when a first instruction field within a first instruction indicates the first instruction is addressed to the first assist;
a second response means, coupled to the main processor and to each assist in the plurality of assists, for allowing the first assist to indicate its readiness to transfer data;
wherein when the first assist becomes detached from the bus and when the first assist does not indicate its presence to the main processor via the first response means, the main processor takes a trap and executes the first instruction.

* * * * *

UNITED STATES PATENT AND TRADEMARK OFFICE
CERTIFICATE OF CORRECTION

PATENT NO. : 4,763,242

DATED : August 9, 1988

INVENTOR(S) : Ruby E. Lee and Michael J. Mahon

It is certified that error appears in the above-identified patent and that said Letters Patent is hereby corrected as shown below:

Column 7, Line 56, "if processor 105 were a pipelined" should read

-- if processor 103 were a pipelined ---;

Column 10, Lines 26 through 27 , "bus and been configured so that the assist is not coupled to the bus, and" should read  -- bus and ---;

Column 11, Line 19, "main process"  should read --- main processor ---.

Signed and Sealed this

Eighth Day of August, 1989

*Attest:*

DONALD J. QUIGG

*Attesting Officer*     *Commissioner of Patents and Trademarks*